United States Patent [19]

Campbell

[11] 4,284,300
[45] Aug. 18, 1981

[54] SECURITY LOCKING ASSEMBLY
[75] Inventor: Michael D. Campbell, Newalla, Okla.
[73] Assignee: Metalfab Industries, Inc., Oklahoma City, Okla.
[21] Appl. No.: 66,079
[22] Filed: Aug. 13, 1979
[51] Int. Cl.³ .............................................. E05C 13/02
[52] U.S. Cl. .................................................. 292/251
[58] Field of Search ............................. 292/251, 315; 70/229–232; 174/37; 151/69

[56] References Cited

U.S. PATENT DOCUMENTS

| | | | |
|---|---|---|---|
| 2,033,371 | 3/1936 | Benaggio | 292/327 X |
| 2,831,520 | 4/1958 | Clarke | 292/251 X |
| 3,330,586 | 7/1967 | Becker | 292/315 |
| 3,572,795 | 3/1971 | Howard | 292/251 |
| 3,782,146 | 1/1974 | Franke | 292/251 X |
| 4,094,173 | 6/1978 | Brown | 70/232 X |

*Primary Examiner*—Richard E. Moore
*Attorney, Agent, or Firm*—Dunlap, Codding & McCarthy

[57] ABSTRACT

A security locking assembly for substantially preventing unauthorized removal of a bolt securing two members together, the security locking assembly comprising a locking assembly housing having a bushing assembly operably disposed in the locking assembly housing for rotatably mounting the locking assembly housing to the two members by the bolt; a pin having a first end portion and a second end portion, extendable through at least a portion of the locking assembly housing; a locking device engaging the first and second end portions of the pin to prevent unauthorized removal of the pin from the locking assembly housing without destruction of a portion of the pin and/or the locking assembly housing; and a cover assembly cooperating with the locking assembly housing and the pin to prevent access to the bolt securing the two members together.

11 Claims, 6 Drawing Figures

SECURITY LOCKING ASSEMBLY

CROSS-REFERENCE TO RELATED APPLICATIONS

This application is related to an application entitled "SECURITY LOCKING ASSEMBLY", U.S. Ser. No. 065,929, filed simultaneously with this application, both applications being assigned to the assignee of the present invention.

BACKGROUND OF THE INVENTION

1. Field of the Invention

This invention relates to a security locking assembly and, more particularly, but not by way of limitation, to a security locking assembly for retarding unauthorized entry into enclosures, such as a housing utilized in an electrical distribution system wherein the housing is suitable for installation and use at ground level. In one aspect, the invention relates to a security locking assembly rotatably mounted on a multi-sectional housing assembly for substantially preventing unauthorized removal of a bolt employed to secure and connect the multi-sectional housing assembly.

2. Brief Description of the Prior Art

In recent years, utilities have more and more been attracted to the use of underground cables and conduits in distribution systems, in preference to the older system of overhead lines supported by poles. However, in the use of underground cables and conduits in such distribution systems, transformers, switching and fusing gear, and the like, must be readily accessible for maintenance, repair, replacement and servicing. Accordingly, surface-mounted stations which utilize a pedestal-type housing assembly have been employed as a covering and enclosure for transformers, switching and fusing gear, and the like.

Problems have, nevertheless, been encountered in the use of the pedestal-type housing assembly for surface or grade level installations in that unauthorized tampering and entry into the housing assembly often occurs. In an effort to prevent unauthorized entry and tampering of the housing assembly, numerous types of security locking assemblies have heretofore been proposed. Certain of the locking assemblies have included the use of specially designed bolts which require a special tool for removal, the use of a cup-shaped member to surround the head of the bolt which requires modification of the housing assembly to receive a plurality of prongs extending from the cup-shaped member, and the like.

Numerous other security locking systems, much more sophisticated and complicated than those set forth above, have also been proposed in the prior art. These more sophisticated and complicated locking systems generally require substantial modification or complete redesign of the housing assembly. Typical of these prior art security locking systems are the systems disclosed in U.S. Pat. No. 4,113,297 and U.S. Pat. No. 4,005,253.

Even in view of the numerous systems heretofore suggested for preventing unauthorized entry into a housing assembly containing electrical apparatus, such as transformers, and their related fusing and switch gear, new and improved security locking systems are being sought which do not require substantial modification of the housing assembly, and which, at the same time, do not require the repairmen desiring entry into the housing to have an unusually large assortment of specialized tools and equipment.

Therefore, an object of the present invention is to provide an improved security locking assembly for retarding unauthorized access to a housing assembly for electrical apparatus wherein the housing assembly is suitable for installation and use at ground level.

Another object of the present invention is to provide an improved security locking system which, while retarding unauthorized entry to the housing assembly for electrical apparatus, can readily be disengaged by a repairman without the use of a substantial number of specialized tools.

Another object of the present invention is to provide an improved security locking assembly for substantially preventing unauthorized entry into the housing assembly for electrical apparatus which does not require substantial modification of the housing assembly.

Another object of the invention is to provide an improved security locking assembly which is durable in construction, economical to manufacture, and which does not suffer from the disadvantages of the prior art devices.

Other objects, advantages and features of the present invention will become apparent to those skilled in the art from a reading of the following detailed description when read in conjunction with the accompanying drawings which illustrate the invention, and the appended claims.

DETAILED DESCRIPTION OF THE INVENTION

Figure 1:
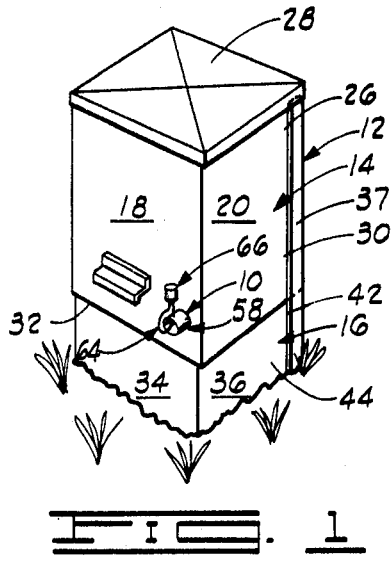
FIG. 1 is a perspective view of a pedestal-type housing assembly for electrical apparatus suitable for installation and use at ground level having the improved security locking assembly of the present invention mounted thereon.
Figure 2:
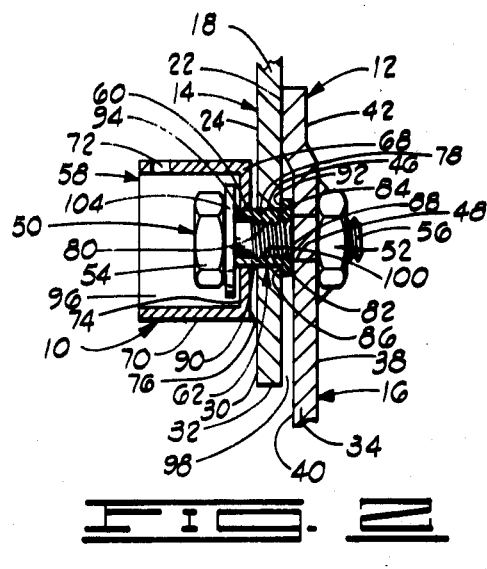
FIG. 2 is a sectional view of one embodiment of the security locking assembly of the present invention rotatably mounted on the housing assembly of FIG. 1 wherein a portion of a bushing assembly of the security locking assembly is disposed between an upper member and a lower member of the housing assembly.
Figure 3:
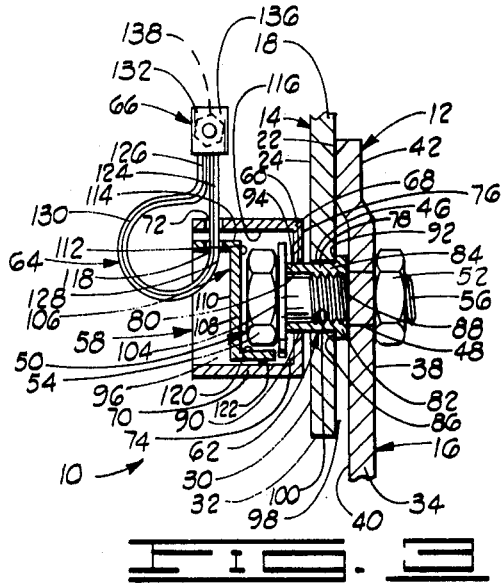
FIG. 3 is a sectional view of the security locking assembly of FIG. 2, having a pin and cover assembly positioned within the locking assembly housing of the security locking assembly.

Referring now to the drawings, in which like numerals are employed to designate like parts throughout same, and particularly to FIGS. 1-3, the security locking assembly 10 is rotatably mounted to a housing assembly 12 for retarding unauthorized access to the electrical apparatus (not shown) contained within the housing assembly 12.

The housing assembly 12, depicted as a pedestal-type housing assembly, is formed of at least two members, such as upper housing 14 and lower housing 16. The upper housing 14, a hollow member, is formed of a multi-plate construction and is provided with three side walls, only side walls 18 and 20 being illustrated. Each of the side walls of the upper housing 14, such as side wall 18 and side wall 20, is provided with an interior surface 22 and an opposed exterior surface 24. The upper housing 14 is further provided with an upper end portion 26 having a cap member 28 secured thereto, a lower end portion 30, and a lower end 32.

The lower housing 16, a hollow member, is formed of a multi-plate construction and has four side walls, only side walls 34 and 36 being depicted. The back side wall (not shown) of the lower housing 16 extends upwardly from the other three side walls of the lower housing 16 and serves as the back side wall for both the upper housing 14 and the lower housing 16 when the upper and lower housings 14, 16 are in the assembled position. Further, the back side wall of the lower housing 16 has a U-shaped configuration in the portion serving as the back side wall of the upper housing 14, the leg portions, such as leg portion 37 of the U-shaped back side wall adapted to receiving the side walls 20, and the opposed side wall (not shown) of the upper housing 14. The construction of such a pedestal-type housing assembly is well known in the art.

Each of the side walls of the lower housing 16, such as side walls 34 and 36, is provided with an interior surface 38 and an opposed exterior surface 40. The lower housing 16 is further provided with an upper end portion 42 and a lower end portion 44. The lower end portion 44 of the lower housing 16 is operably positioned upon and connected to a foundation, such as a cement pad (not shown), in accordance with procedures which are well known in the art. The lower housing 16 is constructed such that at least a portion of the upper end portion 42 of the lower housing 16 is telescopically received by the lower end portion 30 of the upper housing 16. Thus, the exterior surface 40 of at least a portion of the upper end portion of the side walls of the lower housing 16, such as side wall 34 is positioned substantially adjacent the interior surface 22 of the lower end portion of the side walls of the upper housing 14, such as side wall 18 shown in FIGS. 2, 3, 5 and 6.

With reference to FIGS. 2 and 3, an aperture 46 is positioned within the lower end portion 30 of the side wall 18 of the upper housing 14; and, an aperture 48 is positioned within the upper end portion 42 of the side wall 34 of the lower housing 16, the apertures 46 and 48 of the upper and lower housings 14 and 16, respectively, being alignable one with another for receiving a bolt 50 when the upper housing 14 and the lower housing 16 are in an assembled position. The aperture 46 positioned within the side wall 18 of the upper housing 14 has a larger diameter than the aperture 48 of the side wall 34 of the lower housing 16 for reasons which will hereinafter become apparent.

A securing member 52, such as a nut, is affixed to the interior surface 38 of the side wall 34 of the lower housing 16, the securing member 52 being aligned with the aperture 48 of the lower housing 16 and adapted to receive the bolt 50 for securing the upper housing 14 to the lower housing 16 when the housings are in an assembled position. Further, the bolt 50 and the securing member 52 cooperate in mounting the security locking assembly 10 to the upper and lower housings, 14 and 16, respectively, as will be hereinafter described. The securing member 52 can be affixed to the interior surface 38 of the side wall 34 of the lower housing 16 by any suitable means, such as by welding.

The bolt 50 is provided with a bolthead 54 and an operating shaft 56, the operating shaft 56 threadably engaging the securing member 52 for connecting the upper housing 14 to the lower housing 16. When employing the security locking assembly 100 of the present invention the bolt 50 and the dimensions of the bolthead 54 are not critical. However, the security locking assembly 10 of the invention can readily be employed in combination with a penta-head bolt as required by the Specification U-5 for Pad-Mounted Transformers issued January, 1977 by the Rural Electrification Administration of the U.S. Department of Agriculture.

The security locking assembly 10 of the present invention, as depicted in the sectional view of FIG. 3, substantially prevents unauthorized removal of the bolt 50 from the housing assembly 12, and comprises a locking assembly housing 58 having an aperture 60 therein, a bushing assembly 62 disposed in the aperture 60 of the locking assembly housing 58 (for rotatably mounting the locking assembly housing 58 to the upper housing 14 and the lower housing 16 by the bolt 50), a pin 64, and a locking device 66 for securing the pin 64 to the locking assembly housing 58 so as to substantially prevent access to the bolthead 54 in a manner described hereinafter.

The locking assembly housing 58 comprises a base plate 68 having the aperture 60 therethrough, a cylindrical side wall 70 having an aperture 72 therethrough, and the bushing assembly 62 disposed in the aperture 60 of the base plate 68. The aperture 60 of the base plate 68 is alignable with the apertures 46 and 48 of the upper housing 14 and the lower housing 16, respectively, for receiving the bolt 50 when the upper housing 14 and the lower housing 16 are to be assembled and secured via the bolt 50 and the locking assembly 10.

The base plate 68 of the locking assembly housing 58, depicted as having a substantially circular configuration, is provided with a first side 74 and an opposed second side 76. The cylindrical side wall 70 of the locking assembly housing 58 extends outwardly from the first side 74 of the base plate 68 so that the base plate 68 and the cylindrical side wall 70 form a cup member. The aperture 72 is formed in an upper portion of the cylindrical side wall 70 of the locking assembly housing 58 substantially as shown in FIGS. 2 and 3.

The bushing assembly 62 of the locking assembly housing 58 (positionable within the aperture 60 of the base plate 68 for rotatably mounting the locking assembly housing 58 to the upper housing 14 and lower housing 16 by the bolt 50), comprises a body member 78 having a bore 80 extending therethrough, and a flange 82 extending radially from one end portion 84 of the body member 78. The flange 82 is provided with a first surface 86 and an opposed second surface 88. The first surface 86 of the flange 82 cooperates with an exterior surface 90 of the body member 78 to form a shoulder 92. The body member 78 is further provided with a second end portion 94 and the length of the body member 78 is such that upon positioning the body member 78 of the bushing assembly 62 in the aperture 46 of the side wall 18 of the housing assembly 12, the shoulder 92 abuts the interior surface 22 of the side wall 18 surrounding the aperture 46, the opposed second surface 88 of the flange 82 abuts the exterior surface 40 of the side wall 34 around the aperture 48, and the second end portion 94 of the body member 78 extends into an interior portion 96 of the locking assembly housing 58 formed by the base plate 68 and the cylindrical side wall 70. In order to accommodate the positioning of the flange 82 between the side wall 18 of the upper housing 14 and the side wall 34 of the lower housing 16, the upper end portion 42 of the side wall 34 of the lower housing 16 is flared, substantially as shown in FIGS. 2 and 3. Thus, when the opposed exterior surface 40 of the side wall 34 where the side wall is flared is positioned adjacent the interior surface 22 of the side wall 18 a space 98 is formed between the interior surface 22 of the lower end portion 30 of the side wall 18 and the opposed exterior surface 40 of the upper end portion 42 of the side wall 34 in the vicinity of where the apertures 46 and 48 are formed within the side wall 18 and the side wall 34, respectively.

An interior surface 100 of the body member 78 defining the bore 80 is provided with threads in at least a portion thereof for operably engaging the operating shaft 56 of the bolt 50 when the security locking assembly 10 is secured to the side wall 18 of the upper housing 14 and the side wall 34 of the lower housing 16 by the bolt 50. In order to more effectively secure the security locking assembly 10 to the side wall 18 of the upper housing 14 and the side wall 34 of the lower housing 16 it may be desirable to position a washer 104 between the second end portion 94 of the body member 78 of the bushing assembly 82 and the bolthead 54.

Figure 4:
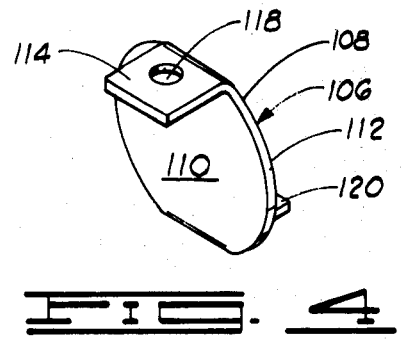
FIG. 4 is a perspective view of the cover assembly of FIG. 3.

Referring more specifically to FIGS. 3 and 4, the security locking assembly 10 further comprises a cover assembly 106. The cover assembly 106 is shaped such that it can be positioned within the interior portion 96 of the locking assembly housing 58 formed by the base plate 68 and the cylindrical side wall 70 and maintained therein by the pin 64. Thus, the cover assembly 106, in combination with the locking assembly housing 58, substantially covers and encloses the bolthead 54 of the bolt 50.

The cover assembly 106 includes a cover plate 108 having a first side 110, an opposed second side 112, and a first tab member 114. The cover plate 108 is depicted as having a generally circular configuration and, as previously mentioned, is shaped so as to be positionable within the interior portion 96 of the locking assembly housing 58 as defined by the cylindrical side wall 70 and the base plate 68. The first tab member 114 extends outwardly from near one edge portion of the first side 110 of the cover plate 108 so as to be disposed near an interior portion 116 of the cylindrical side wall 70 of the locking assembly housing 58. The tab member 114 is provided with an aperture 118 therein, the aperture 118 of the tab member 114 being alignable with the aperture 72 of the cylindrical side wall 70 of the locking assembly housing 58 so that the pin 64 can be positioned therethrough to secure the cover assembly 106 within the locking assembly housing 58. Desirably, a second tab member 120 extends outwardly from near one edge portion of the opposed second side 112 of the cover plate 108, the second tab member 120 being positioned a distance removed from the tab member 114 and opposite thereto substantially as shown in FIGS. 3 and 4. Further, the second tab member 120 is shaped such that the second tab member 120 is disposed near a second interior portion 122 of the cylindrical side wall 70 when the cover assembly 106 is placed in the locking assembly housing 58.

The pin 64 is shaped and constructed such that when the pin 64 is positioned within the aperture 72 of the cylindrical side wall 70 of the locking assembly housing 58, a portion of the pin 64 will be disposed near and above at least a portion of the bolthead 54 of the bolt 50 and prevent access to the bolthead 54. Further, the pin 64 secures the cover assembly 106 within the interior portion 96 of the cylindrical side wall 70 of the locking assembly housing 58 as hereinbefore described.

The pin 64 is provided with a first end portion 124, a second end portion 126, a first medial portion 128 and a second medial portion 130. The pin 64 is shaped such that the first end portion 124 is disposed near the second end portion 126 when the pin 64 is in a connected position. As shown in FIG. 3, the first medial portion 128 of the pin 64 extends through the aligned apertures 72 and 118 of the cylindrical side wall 70 and the first tab member 114, respectively; the second medial portion 130 of the pin 64 loops around the outside end of the locking assembly housing 58; and, the first and second end portions, 124 and 126, of the pin 64 are adjacent one another in a substantially parallel relationship.

The pin 64 is secured in the locking assembly housing 58 by the locking device 66, which is preferably any suitable device which prevents the removal of the pin 64 from the locking assembly housing 58 without destruction of either the pin 64 or the locking assembly housing 58. This enables a repairman to readily detect if an unauthorized entry or attempted entry into the housing assembly 12 has been made or attempted. As shown in FIG. 3, the pin 64 can readily be secured in the locking assembly housing 58 by a collar member 132 which is slidably positioned upon the first end portion 124 and the second end portion 126 of the pin 64. The collar member 132 can be secured to the first and second end portions 124 and 126 of the pin 64 by any suitable means. One effective method for securing the collar member 132 upon the first and second end portions 124 and 126 of the pin 64 is to provide a threaded aperture within a side portion 136 of the collar member 132. The threaded aperture is adapted to receive a threaded bolt 138 (shown in phantom in FIG. 3) which is disposed to have a portion extend between the first or second end portions 124 and 126 of the pin 64, the bolt 138 thereby serving to forcibly press the first and second end portions 124, 126 of the pin 64 against the interior surfaces of the collar member 132. As the bolt 138 is driven into the threaded aperture, the collar member 132 is caused to be securely attached to the first and second end portions 124, 126 of the pin 64.

In order to prevent unauthorized removal of the collar member 132 from the pin 64 it is desirable that the threaded bolt 138 be fabricated of a material such as aluminum so that upon driving the threaded bolt 138 into firm engagement with the threaded aperture of the collar member 132, such that the collar member 132 is securely attached to the first and second end portions 124, 126 of the pin 64, a minor amount of additional torque applied to the bolt 138 will sever the portion of the bolt 138 extending outwardly from the collar member 132.

Referring now to FIGS. 1 and 4–6, a modified bushing assembly 62a for use in a modified security locking assembly 10a constructed in accordance with the present invention is set forth.

The housing assembly 12, as hereinbefore described, is a pedestal-type housing assembly formed of at least two members, such as the upper housing 14 and the lower housing 16. The upper housing 14, a hollow member, is formed of a multiplate construction and is provided with three side walls, only side walls 18 and 20 being illustrated. Each of the side walls of the upper housing 14, such as side wall 18 and side wall 20, is provided with an interior surface 22 and an opposed exterior surface 24. The upper housing 14 is further provided with an upper end portion 26 having a cap member 28 secured thereto, a lower end portion 30, and a lower end 32.

The lower housing 16, a hollow member, is formed of a multi-plate construction and has four side walls, only side walls 34 and 36 being depicted. The back side wall (not shown) of the lower housing 16 extends upwardly from the other three side walls of the lower housing 16 and serves as the back side wall for both the upper housing 14 and the lower housing 16 when the upper and lower housings 14, 16 are in the assembled position. Further, the back side wall of the lower housing 16 has a U-shaped configuration in the portion serving as the back side wall of the upper housing 14, the leg portions, such as leg portion 37 of the U-shaped back side wall adapted to receiving the side walls 20, and the opposed side wall (not shown) of the upper housing 14. The construction of such a pedestal-type housing assembly is well known in the art.

Each of the side walls of the lower housing 16, such as side walls 34 and 36, is provided with an interior surface 38 and an opposed exterior surface 40. The lower housing 16 is further provided with an upper end portion 42 and a lower end portion 44. The lower end portion 44 of the lower housing 16 is operably positioned upon and connected to a foundation, such as a cement pad (not shown), in accordance with procedures which are well known in the art. The lower housing 16 is constructed such that at least a portion of the upper end portion 42 of the lower housing 16 is telescopically received by the lower end portion 30 of the upper housing 16. Thus, the exterior surface 40 of at least a portion of the upper end portion of the side walls of the lower housing 16, such as side wall 34, is positioned substantially adjacent the interior surface 22 of the lower end portion of the side walls of the upper housing 14, such as side wall 18, shown in FIGS. 5 and 6.

Figure 5:
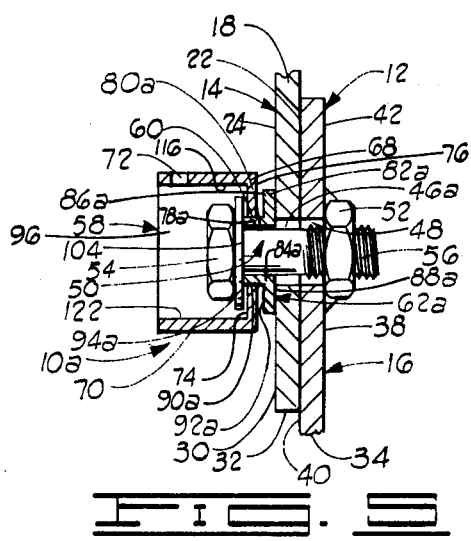
FIG. 5 is a sectional view of a second embodiment of the security locking assembly of the present invention rotatably mounted on the housing assembly of FIG. 1 wherein a bushing assembly abuts the exterior portion of the housing assembly.
Figure 6:
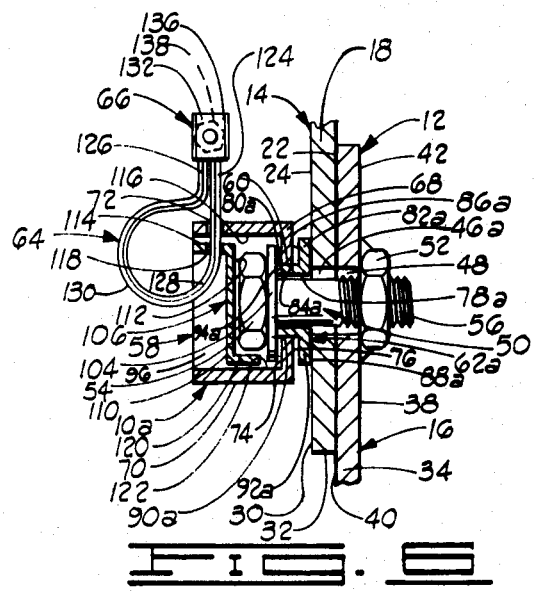
FIG. 6 is a sectional view of the security locking assembly of FIG. 5, having a pin and cover assembly positioned within the locking assembly housing of the security locking assembly.

With reference to FIGS. 5 and 6, an aperture 46a is positioned within the lower end portion 30 of the side wall 18 of the upper housing 14; and, an aperture 48 is positioned within the upper end portion 42 of the side wall 34 of the lower housing 16, the apertures 46a and 48 of the upper and lower housings 14 and 16, respectively, being alignable one with another for receiving the bolt 50 when the upper housing 14 and the lower housing 16 are in an assembled position. In this embodiment, the aperture 46a positioned within the side wall 18 of the upper housing 14 is substantially the same size as the aperture 48 of the side wall 34 of the lower housing 16.

The securing member 52, such as a nut, is affixed to the interior surface 38 of the side wall 34 of the lower housing 16, the securing member 52 being aligned with the aperture 48 of the lower housing 16 and adapted to receive the bolt 50 for securing the upper housing 14 to the lower housing 16 when the housings are in an assembled position. Further, the bolt 50 and the securing member 52 cooperate in mounting the security locking assembly 10a to the upper and lower housings 14 and 16, respectively, as will be hereinafter described. The securing member 52 can be affixed to the interior surface 38 of the side wall 34 of the lower housing 16 by any suitable means, such as by welding.

The bolt 50 is provided with the bolthead 54 and the operating shaft 56, the operating shaft 56 threadably engaging the securing member 52 for connecting the upper housing 14 to the lower housing 16. When employing the security locking assembly 10a of the present invention the bolt 50 and the dimensions of the bolthead 54 are not critical. However, the security locking assembly 10a of the invention can readily be employed in combination with a penta-head bolt as required by the Specification U-5 for Pad-Mounted Transformers, issued January, 1977, by the Rural Electrification Administration of the U.S. Department of Agriculture.

The security locking assembly 10a of the present invention, as depicted in the sectional view of FIG. 6, substantially prevents unauthorized removal of the bolt 50 from the housing assembly 12, and comprises locking assembly housing 58 having aperture 60 therein, bushing assembly 62a disposed in the aperture 60 of the locking assembly housing 58 (for rotatably mounting the locking assembly housing 58 to the upper housing 14 and the lower housing 16 by the bolt 50), pin 64, and locking device 66 for securing the pin 64 to the locking assembly housing 58 so as to substantially prevent access to the bolthead 54 in a manner described hereinafter.

The locking assembly housing 58 comprises the base plate 68 having the aperture 60 therethrough, the cylindrical side wall 70 having aperture 72 therethrough, and the bushing assembly 62a disposed in the aperture 60 of the base plate 68. The aperture 60 of the base plate 68 is alignable with the apertures 46a and 48 of the upper housing 14 and the lower housing 16, respectively, for receiving the bolt 50 when the upper housing 14 and the lower housing 16 are to be assembled and secured via the bolt 50 and the locking assembly 10a.

The base plate 68 of the locking assembly housing 58, depicted as having a substantially circular configuration, is provided with first side 74 and opposed second side 76. The cylindrical side wall 70 of the locking assembly housing 58 extends outwardly from the first side 74 of the base plate 68 so that the base plate 68 and the cylindrical side wall 70 form the cup member as hereinbefore described. The aperture 72 is formed in the upper portion of the cylindrical side wall 70 of the locking assembly housing 58 substantially as shown in FIGS. 5 and 6.

The bushing assembly 62a of the locking assembly housing 58 (positionable within the aperture 60 of the base plate 68 for rotatably mounting the locking assembly housing 58 to the upper housing 14 and lower housing 16 by the bolt 50), comprises a body member 78a having a bore 80a extending therethrough, and a flange 82a extending radially from one end portion 84a of the body member 78a. The flange 82a is provided with a first surface 86a and an opposed second surface 88a. The first surface 86a of the flange 82a cooperates with an exterior surface 90a of the body member 78a to form a shoulder 92a. The body member 78a is further provided with a second end portion 94a and the length of the body member 78a is such that upon positioning the body member 78a of the bushing assembly 62a in the aperture 60 of the base plate 68 of the locking assembly housing 58 the shoulder abuts or is positioned in close proximity to the opposed second side 76 of the base plate 68 of the locking assembly housing 58; the lower surface 88a of the flange 82a abuts the exterior surface 24 of the side wall 18 around the aperture 46a; and, the second end portion 94a of the body member 78a extends into the interior portion 96 of the locking assembly housing 58 formed by the base plate 68 and the cylindrical side wall 70. In order to more effectively secure the security locking assembly 10a to the side wall 18 of the upper housing 14 and the side wall 34 of the lower housing 16 it may be desirable to position the washer 104 between the second end portion 94a of the body member 78a of the bushing assembly 82a and the bolthead 54.

Referring more specifically to FIGS. 4 and 6, the security locking assembly 10a further comprises a cover assembly 106. The cover assembly 106 is shaped such that it can be positioned within the interior portion 96 of the locking assembly housing 58 formed by the base plate 68 and the cylindrical side wall 70 and maintained therein by the pin 64. Thus, the cover assembly 106, in combination with the locking assembly housing 58, substantially covers and encloses the bolthead 54 of the bolt 50.

The cover assembly 106 includes the cover plate 108 having first side 110, opposed second side 112, and first tab member 114. The cover plate 108, is, as previously stated, shaped so as to be positionable within the interior portion 96 of the locking assembly housing 58 as defined by the cylindrical side wall 70 and the base plate 68. The first tab member 114 extends outwardly from near one edge portion of the first side 110 of the cover plate 108 so as to be disposed near the interior portion 116 of the cylindrical side wall 70 of the locking assembly housing 58. The tab member 114 is provided with the aperture 118 therein, the aperture 118 of the tab member 114 being alignable with the aperture 72 of the cylindrical side wall 70 of the locking assembly housing 58 so that the pin 64 can be positioned therethrough to secure the cover assembly 106 within the locking assembly housing 58. Desirably, the second tab member 120 extends outwardly from near one edge portion of the opposed second side 112 of the cover plate 108, the second tab member 120 being positioned a distance removed from the tab member 114 and opposite thereto substantially as shown in FIGS. 4 and 6. Further, the second tab member 120 is shaped such that the second tab member 120 is disposed near the second interior portion 122 of the cylindrical side wall 70 when the cover assembly 106 is placed in the locking assembly housing 58.

The pin 64, as previously described with reference to FIG. 3, is shaped and constructed such that when the pin 64 is positioned within the aperture 72 of the cylindrical side wall 70 of the locking assembly housing 58, a portion of the pin 64 will be disposed near and above at least a portion of the bolthead 54 of the bolt 50 and prevent access to the bolthead 54. Further, the pin 64 secures the cover assembly 106 within the interior portion 96 of the cylindrical side wall 70 of the locking assembly housing 58 as hereinbefore described.

The pin 64 is provided with the first end portion 124, the second end portion 126, the first medial portion 128 and the second medial portion 130. The pin 64 is shaped such that the first end portion 124 is disposed near the second end portion 126 when the pin 64 is in a connected position. As shown in FIG. 6, the first medial portion 128 of the pin 64 extends through aligned apertures 72 and 118 of the cylindrical side wall 70 and the first tab member 114, respectively; the second medial portion 130 of the pin 64 loops around the outside end of the locking assembly housing 58; and, the first and second end portions, 124 and 126, of the pin 64 are adjacent one another in a substantially parallel relationship.

The pin 64 is secured in the locking assembly housing 58 by the locking device 66, which is preferably any suitable device that prevents the removal of the pin 64 from the locking assembly housing 58 without destruction of either the pin 64 or the locking assembly housing 58. This enables a repairman to readily detect if an unauthorized entry or attempted entry into the housing assembly 12 has been made or attempted. As shown in FIG. 6, the pin 64 can readily be secured in the locking assembly housing 58 by the collar member 132 which is slidably positioned upon the first end portion 124 and the second end portion 126 of the pin 64. The collar member 132 can be secured to the first and second end portions 124 and 126 of the pin 64 by any suitable means. One effective method for securing the collar member 132 upon the first and second end portions 124 and 126 of the pin 64 is to provide a threaded aperture within the side portion 136 of the collar member 132. The threaded aperture is adapted to receive the threaded bolt 138 (shown in phantom in FIG. 6) which is disposed to have a portion extend between the first or second end portions 124 and 126 of the pin 64, the bolt 138 thereby serving to forcibly press the first and second end portions 124, 126 of the pin 64 against the interior surfaces of the collar member 132. As the bolt 136 is driven into the threaded aperture, the collar member 132 is caused to be securely attached to the first and second end portions 124, 126 of the pin 64.

In order to prevent unauthorized removal of the collar member 132 from the pin 64 it is desirable that the threaded bolt 138 be fabricated of a material such as aluminum so that upon driving the threaded bolt 138 into firm engagement with the threaded aperture of the collar member 132, such that the collar member 132 is securely attached to the first and second end portions 124, 126 of the pin 64, an effective amount of additional torque applied to the bolt 138 will sever the portion of the bolt 138 extending outwardly from the collar member 132.

Although particular embodiments of the security locking assemblies 10 and 10a have been disclosed and illustrated by certain drawings wherein the locking assembly housing 58 is rotatably mounted to the housing 12, for preventing removal of the bolt 50 from the housing 12 and thus gain unauthorized entry into the housing 12, such are intended for illustrative purposes only and alternatives or equivalents may readily occur to those skilled in the art without departing from the spirit or scope of the invention as set forth in the appended claims.

What is claimed is:

1. An improved security locking assembly for substantially preventing unauthorized removal of a bolt having a bolthead, the bolt operably engaging a securing member for joining a first housing to a second housing when one of the housings telescopically receives a portion of the other of the housings, each of the housings having an aperture therein such that in a connected position the apertures of the housings are aligned for receiving the bolt, the locking assembly comprising:

a locking assembly housing comprising:

a base plate having a first side, an opposed second side, and an aperture; and wall means having at least one aperture therein, the wall means extending outwardly from the first side of the base plate such that the aperture of the base plate is alignable with the apertures of the first and second housings for receiving the bolt;

a bushing assembly disposed within the aperture of the base plate for rotatably mounting the locking assembly housing to the first and second housings by the bolt, the bushing assembly comprising:

a body member having a bore extending therethrough, the body member further defined as having a first end portion and an opposed second end portion; and a flange extending radially from the first end portion of the body, the flange having a first surface for cooperating with the body member to form a shoulder for supporting one of the locking assembly housing and the first housing, the second surface abutting a portion of one of the first or second housings;

a cover assembly comprising:

a cover plate having a first side and an opposed second side, the cover plate being shaped such that the cover plate is positionable within an interior portion of the locking assembly housing defined by the wall means and the base plate such that the cover plate substantially covers the bolt head; and a first tab member having an aperture therein, the first tab member extending from the first side of the cover plate and disposed near a first interior portion of the wall means of the locking assembly housing such that in a connected position the aperture of the first tab member is aligned with the aperture of the wall means;

a pin having a first end portion and a second end portion, one of the first and second end portions of the pin extending through the aligned apertures of the wall means and the first tab member for connecting the cover plate to the wall means of the locking assembly housing, the pin being shaped such that the first end portion of the pin is disposed near the second end portion of the pin, so that in an assembled position the pin, the locking assembly housing, and the cover assembly cooperate to secure the cover plate of the cover assembly in a bolthead covering position; and means for securing the first end portion of the pin to the second end portion of the pin to substantially prevent removal of the pin from the locking assembly housing and the cover plate of the cover assembly without destruction of a portion of one of the pin and the locking assembly housing.

2. The security locking assembly of claim 1 wherein the pin further includes a first medial portion and a second medial portion, the pin being shaped such that in the connected position the first medial portion extends through the aligned apertures of the first tab member of the cover assembly and the wall means of the locking assembly housing, the second medial portion is disposed above the first tab member of the cover assembly and the wall means of the locking assembly housing, and the first and second end portions of the pin are disposed substantially adjacent one another.

3. The security locking assembly of claim 2 wherein the means for securing the first end portion of the pin to the second end portion is a collar member.

4. The security locking assembly of claim 3 wherein the collar member is defined further as having a threaded aperture through one side portion, and wherein the security locking assembly further comprises a threaded bolt, the threaded bolt being shaped such that the threaded bolt is threadably engagable with the threaded aperture of the collar member for securely affixing the collar member to the first and second end portion of the pin, the threaded bolt further characterized as being fabricated of a material such that when the threaded bolt is driven into the threaded aperture of the collar member and engages one of the first and second end portions of the pin, a minor effective amount of additional torque applied to the threaded bolt will sever the portion of the bolt extending outwardly from the collar member.

5. The security locking assembly of claim 4 wherein the second housing is provided with a flared portion in an upper portion thereof, the flared portion of the second housing cooperating with a portion of the first housing to provide a space between the first housing and the second housing such that in an assembled position the flange of the bushing assembly is disposed with the space formed therebetween.

6. The security locking assembly of claim 5 wherein the cover assembly further comprises a second tab member extending from the opposed second side of the cover plate, the second tab member being positioned a distance from the first tab member and shaped such that the second tab member is disposed in close proximity to a second interior portion of the wall means of the locking assembly housing.

7. The security locking assembly of claim 2 wherein the wall means is a cylindrical shaped side wall.

8. The security locking assembly of claim 1 wherein the second housing is provided with a flared portion in an upper portion thereof, the flared portion of the second housing cooperating with a lower, adjacently disposed portion of the first housing to provide a space therebetween such that in an assembled position the flange of the bushing assembly is disposed within the space.

9. The security locking assembly of claim 1 wherein the flange of the bushing assembly abutts a portion of the first housing and the bore of the body member of the bushing assembly is aligned with the apertures in the first and second housings.

10. The security locking assembly of claim 1 wherein the cover assembly further comprises a second tab member extending from the opposed second side of the cover plate, the second tab member being positioned a distance from the first tab member and disposed near a second interior portion of the wall means of the locking assembly housing.

11. The security locking assembly of claim 5 wherein the first housing is an upper housing and the second housing is a lower housing, the upper housing telescopically receiving a portion of the lower housing such that the apertures therein are aligned, and the flange of the bushing assembly abut a portion of the upper housing defining the aperture therein.

* * * * *

UNITED STATES PATENT AND TRADEMARK OFFICE
CERTIFICATE OF CORRECTION

PATENT NO. : 4,284,300
DATED : August 18, 1981
INVENTOR(S) : Michael D. Campbell It is certified that error appears in the above-identified patent and that said Letters Patent are hereby corrected as shown below:

Column 4, line 10, the numeral "100" should be --10--.

Signed and Sealed this

Twelfth Day of January 1982

[SEAL]

Attest:

GERALD J. MOSSINGHOFF

Attesting Officer

Commissioner of Patents and Trademarks